Oct. 29, 1929.　　　R. M. CRITCHFIELD　　　1,733,864

ELECTRIC MOTOR

Filed Dec. 19, 1924

Inventor
Robert M. Critchfield
By Spencer Swall and Hardman
Attorney

Patented Oct. 29, 1929

1,733,864

UNITED STATES PATENT OFFICE

ROBERT M. CRITCHFIELD, OF ANDERSON, INDIANA, ASSIGNOR, BY MESNE ASSIGNMENTS, TO DELCO-REMY CORPORATION, OF DAYTON, OHIO, A CORPORATION OF DELAWARE

ELECTRIC MOTOR

Application filed December 19, 1924. Serial No. 757,021.

This invention relates to improvements in dynamo electric machines and more particularly to small electric motors such as are used in electric horns for automobiles.

It is among the objects of the invention to improve and simplify the construction of motors of this type in order to reduce the cost of manufacture and to obtain a more durable construction.

Further objects and advantages of the present invention will be apparent from the following description, reference being had to the accompanying drawing, wherein a preferred form of embodiment of the present invention is clearly shown.

Figure 1:
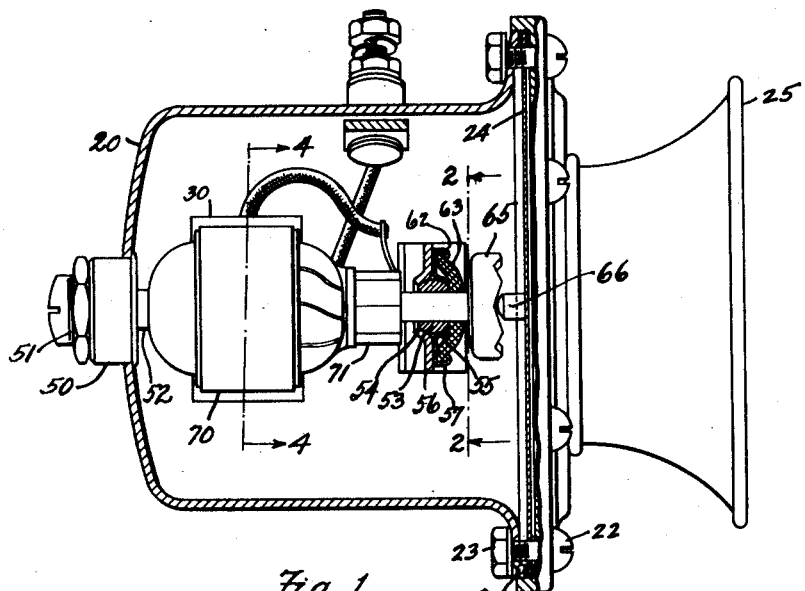
Fig. 1 is a side view partly in section of a motor operated horn embodying the present invention.
Figures 2, 3:
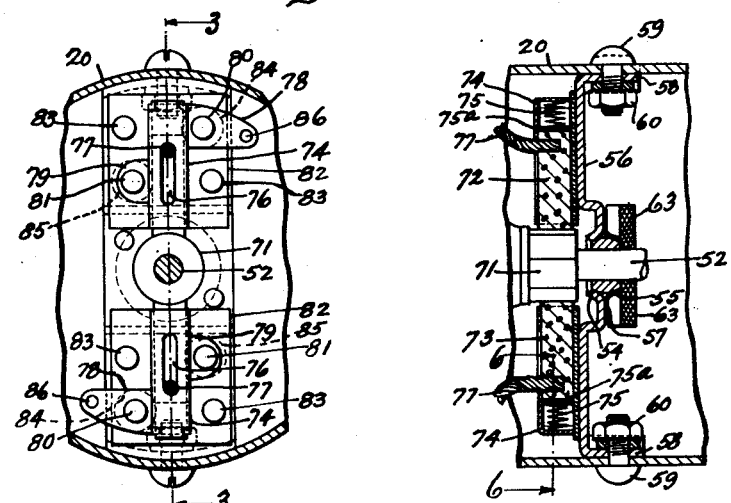
Fig. 2 is a fragmentary view partly in section, the view being taken on the line 2—2 of Fig. 1.
Fig. 3 is a sectional view on the line 3—3 of Fig. 2.

Referring to the drawings, the particular motor operated horn, which is chosen by way of example to illustrate the use of the present invention, includes a cup-shaped motor field frame 20 having a flange 21 to which are secured by bolts 22 and nuts 23 a horn diaphragm 24 and a sound amplifier 25.

Figure 4:
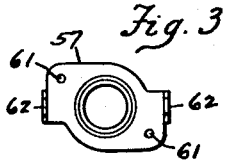
Fig. 4 is a plan view of a bearing supporting member.

Centrally thereof the frame 20 supports a bushing 50 which is interiorly threaded to receive a sleeve 51 supporting a bearing for the armature shaft 52, the other end of which is supported by a self-aligning bearing 53 having a spherical exterior which is confined by the substantially spherical annular flanges 54 and 55 provided respectively by a bearing bridge 56 and a bracket 57. The bridge 56 extends diametrically across the space within the field frame 20 and is provided with supporting arms 58 which are attached to diametrically opposite portions of the frame 20 by bolts 59 and nuts 60. The bracket 57, a plan view of which is shown in Fig. 4, is provided with holes 61 for receiving the rivets which secure the bracket 57 to the bridge 56.

The bracket 57 is provided with ears 62 for securing on opposite sides of the shaft 52 the ends of a felt washer 63 which surrounds the shaft 52 and is closely adjacent the bearing 53. The washer 63 is soaked with lubricating oil which is fed by the washer to the surfaces of the shaft and bearing. The bearing 53 may be made of porous bearing metal in order to absorb oil and deliver it as needed to the bearing surface, and the bearing within the sleeve 51 may be a grease packed ball bearing of a form which is known to the trade. The shaft 52 supports a ratchet 65 which cooperates with an anvil or wear piece 66 to effect the sound producing movement of the diaphragm 24.

While the form of embodiment of the present invention as herein disclosed, constitutes a preferred form, it is to be understood that other forms might be adopted, all coming within the scope of the claims which follow.

What is claimed is as follows:

1. In a lubricating device, the combination with a self-aligning shaft bearing supported between a frame and a bracket; of a fibrous lubricant containing member supported by the bracket so as to engage the bearing.

2. In a lubricating device, the combination with a shaft bearing supported between a frame and a bracket; of a plurality of ears on said bracket; supporting a fibrous lubricant containing member so as to lie in juxtaposition to the bearing.

3. In a lubricating device, the combination with an apertured self-aligning bearing member supported between a frame and a bracket both of which are apertured coaxially of the bearing; said bracket having ears engaging and supporting a lubricant containing washer so as to engage and lie in coaxial alignment with the bearing.

In testimony whereof I hereto affix my signature.

R. M. CRITCHFIELD.